United States Patent [19]

Draghetti

[11] Patent Number: 5,310,041
[45] Date of Patent: May 10, 1994

[54] DEVICE FOR EQUALLY-SPACED TRANSPORTATION OF RANDOMLY ARRANGED INCOMING PRODUCTS

[75] Inventor: Fiorenzo Draghetti, Medicina, Italy

[73] Assignee: G. D Societa' per Azioni, Bologna, Italy

[21] Appl. No.: 899,298

[22] Filed: Jun. 16, 1992

[30] Foreign Application Priority Data

Jun. 21, 1991 [IT] Italy .............................. B091A000220

[51] Int. Cl.⁵ .......................................... B65G 47/24
[52] U.S. Cl. .................................. 198/412; 198/480.1
[58] Field of Search ................... 198/479.1, 480.1, 412

[56] References Cited

U.S. PATENT DOCUMENTS

| | | | |
|---|---|---|---|
| 4,077,524 | 3/1978 | Rysti | 198/491 |
| 4,619,357 | 10/1986 | Radzins et al. | 198/412 |
| 4,863,154 | 9/1989 | Hirakawa et al. | 198/450 |

FOREIGN PATENT DOCUMENTS

| | | |
|---|---|---|
| 0206596 | 12/1986 | European Pat. Off. |
| 2099389 | 12/1982 | United Kingdom |
| 2199297 | 7/1986 | United Kingdom |

*Primary Examiner*—Cheryl L. Gastineau
*Attorney, Agent, or Firm*—Sandler Greenblum & Bernstein

[57] ABSTRACT

A device for equally-spaced transportation of randomly arranged incoming products, such as packets of cigarettes, whereby the products traveling successively and in randomly arranged manner along a first path and in a first given direction are brought into engagement with a braking device for forming an orderly line of products, which are removed successively from the first path by a transfer device and in a substantially transverse pickup direction in relation to the first traveling direction, and are fed, rotated 90°, on to a second path along which they are fed continuously and in equally-spaced manner in a second direction forming any angle in relation to the first traveling direction.

14 Claims, 2 Drawing Sheets

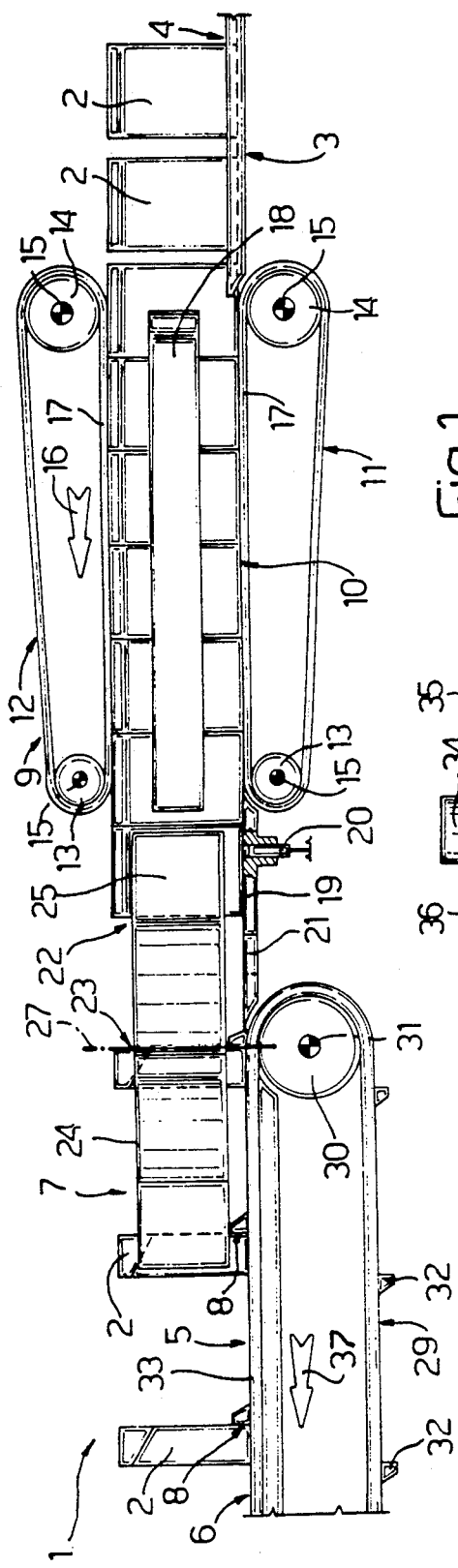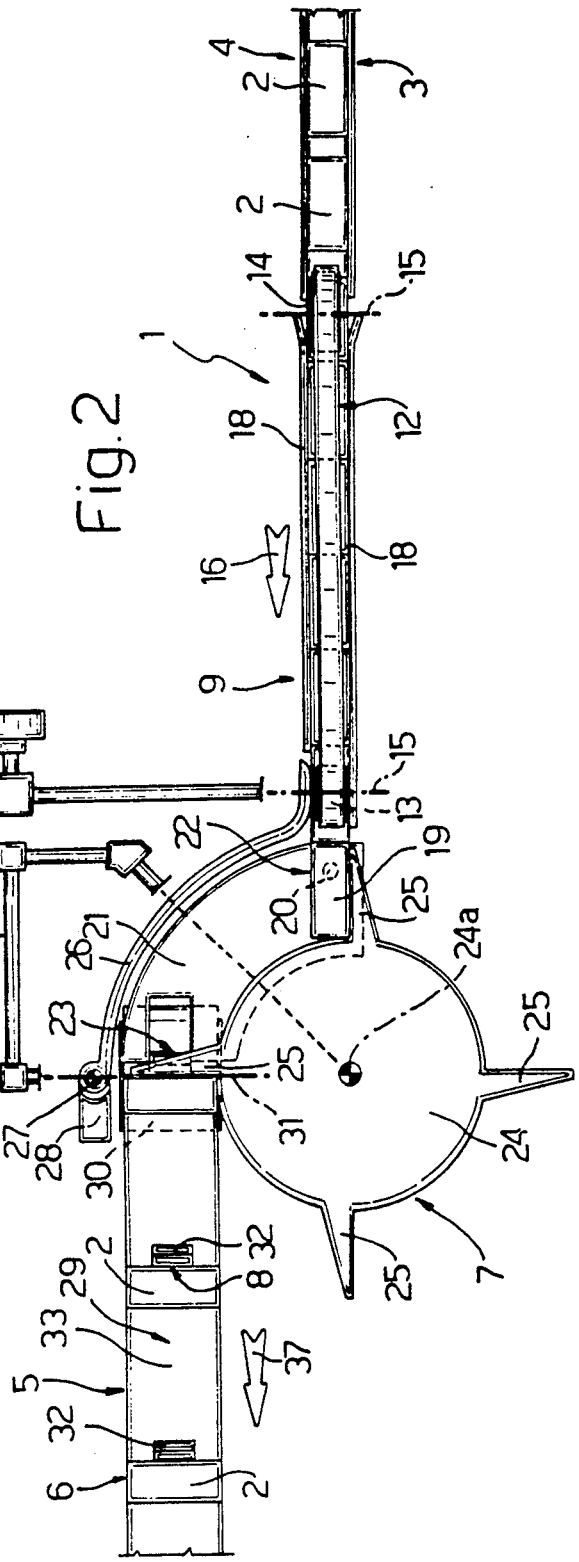

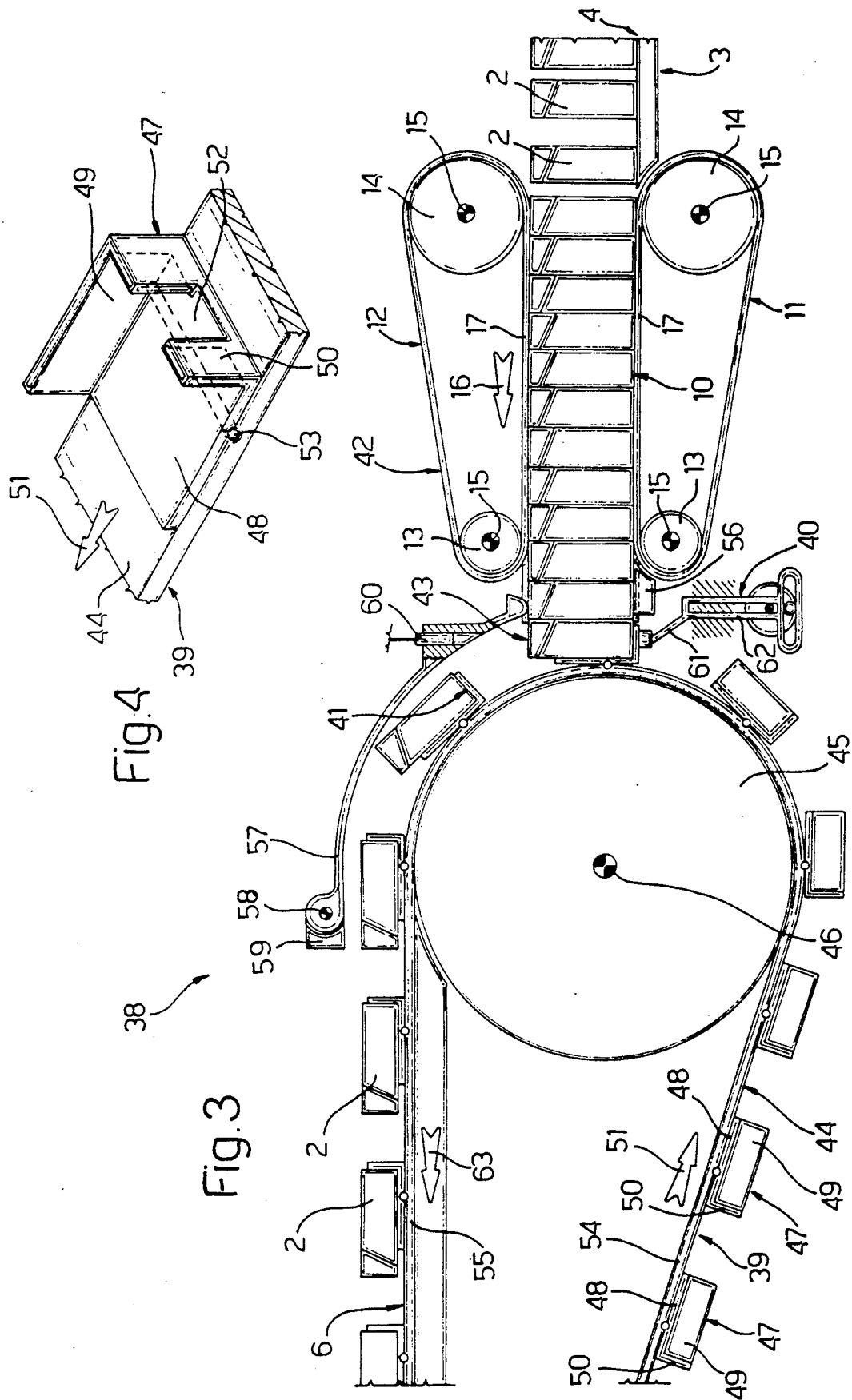

5,310,041

DEVICE FOR EQUALLY-SPACED TRANSPORTATION OF RANDOMLY ARRANGED INCOMING PRODUCTS

BACKGROUND OF THE INVENTION

The present invention relates to a device for transporting randomly arranged incoming products in equally-spaced manner.

The present invention is particularly suitable for packing machines in general, and cigarette packing machines in particular, to which the following description refers purely by way of example.

In cigarette packing machines, the problem of transporting randomly arranged incoming products, in this case packets of cigarettes, in an equally-spaced manner is normally solved using devices comprising first and second conveyors perpendicular to each other; and a transfer device located over the point at which the two conveyors meet, and which provides, at a constant rate, for transferring the packets traveling in a randomly arranged manner on the first conveyor from the output end of the first conveyor to the input end of the second conveyor. As they are transferred, the packets are rotated 90° in relation to the traveling direction, so that, if they are traveling, for example, along the first conveyor with the larger side facing forward, they are fed with the smaller side or the end surface facing forward along the second conveyor.

In other words, on known devices of the aforementioned type, equally spacing the randomly arranged incoming packets necessarily involves a 90° variation in the traveling direction of the packets, and, consequently, 90° rotation of the packets in relation to said traveling direction.

Such variations in both the traveling direction and the position of the randomly arranged incoming products in relation to the traveling direction are not always desirable. Generally speaking, in fact, only rotation of the product may be used to advantage, whereas the 90° change in the traveling direction of the products poses serious problems as regards the size and overall design of the packing machine.

SUMMARY OF THE INVENTION

It is an object of the present invention to provide a straightforward device for effectively controlling randomly arranged products fed off a production machine or a portion of a production machine, and for transporting the products, rotated 90°, in any direction and in orderly sequence.

More generally speaking, it is an object of the present invention to provide a device enabling randomly arranged incoming products to be rotated 90° and arranged in orderly sequence, without said rotation necessarily involving a given change in the traveling direction of the products.

According to the present invention, there is provided a device for equally-spaced transportation of randomly arranged incoming products, said device comprising a first conveyor for transporting said products successively and in a randomly arranged manner along a first path; a second conveyor for transporting said products at a constant rate along a second path; transfer means for removing said products, at a given rate, from said first path; and braking means located along said first path, for forming an orderly line of said products for supply, at a given rate, to said transfer means; wherein said first and second paths are arranged in series at any given angle to each other; and that said transfer means are located between the output end of said first path and said second conveyor, for successively removing said products from said first path in a substantially transverse pickup direction in relation to said first traveling direction; first drive means being provided for operating said transfer means and said second conveyor in time with each other; second drive means being provided for operating said brake means; and said second drive means being provided with control means for operating said brake means in time with said transfer means.

BRIEF DESCRIPTION OF THE DRAWINGS

Non-limiting embodiments of the present invention will be described by way of example with reference to the accompanying drawings, in which:

FIG. 1 shows a schematic side view of a first preferred embodiment of the device according to the present invention;

FIG. 2 shows a plan view of the FIG. 1 device;

FIG. 3 shows a side view of a second embodiment of the FIG. 1 device;

FIG. 4 shows an enlarged view in perspective of a detail in FIG. 3.

DETAILED DESCRIPTION OF THE INVENTION

Number 1 in FIG. 1 indicates a device for transporting randomly arranged incoming packets of cigarettes 2 in equally-spaced manner.

Device 1 comprises a first conveyor 3 for successively transporting randomly arranged packets 2 along the input portion of first path 4; a second conveyor 5 for transporting packets 2 in an equally-spaced manner along a second path 6 in series with and extending, in the example shown, parallel to path 4, but which may form angles of other than zero with said path 4; and a transfer device 7 for successively transferring packets 2 from path 4 into respective seats 8 moving with conveyor 5 along path 6 and equally spaced along conveyor 5.

As shown, particularly in FIG. 2, packets 2 on conveyor 3 form a line in which adjacent packets 2 are spaced at random, which situation is maintained along the whole of conveyor 3 until packets 2 are fed from conveyor 3 to a braking device 9 in series with conveyor 3 along path 4.

Braking device 9 defines the output portion of path 4, and provides for slowing down packets 2 along path 4, and so forming them into a continuous orderly line 10 in which each contacts an adjacent packet 2.

Braking device 9 comprises two belts 11, 12 located respectively below and above line 10, and so constituting a conveyor for feeding packets 2 in line 10 to transfer device 7. Belts 11, 12 are looped about respective pairs of pulleys 13, 14 fitted to respective shafts 15 perpendicular to the FIG. 1 plane and to the traveling direction 16 of conveyor 3, and parallel to the plane of conveyor 3. Belts 11, 12 present respective facing straight portions 17 moving in direction 16 at a generally slower speed than conveyor 3 and of which portion 17 of belt 11 is located coplanar with conveyor 3. Portions 17 cooperate with the top and bottom ends of packets 2, so as to vary the traveling speed of the same and so form line 10.

In addition to belts 11 and 12, braking device 9 also comprises two shoulders 18 located between belts 11 and 12 and on either side of packets 2 in line 10.

The end of braking device 9 facing conveyor 5 presents the rear end (in relation to the traveling direction of packets 2) of a fixed plate 19, the front end of which coincides with the output end of path 4. Plate 19 is substantially coplanar with portion 17 of belt 11, and is fitted through with a photosensor 20 for detecting the rate and timing with which packets 2 in line 10 issue from braking device 9.

The front end of plate 19 is coplanar with and adjacent to a curved horizontal plate 21 connecting the output end of path 4 to the input end of path 6. Plate 21 extends over an arc, in the example shown, of substantially 90°, and comprises an input portion extending transversely in relation to path 4 and defining an unloading station 22; and an output portion substantially coaxial with path 6 and defining a loading station 23 adjacent to the input of conveyor 5.

Plate 21 provides for supporting packets 2 as they are fed between stations 22 and 23, and forms part of device 7 for transferring packets 2 from braking device 9 to conveyor 5.

As shown more clearly in FIG. 2, device 7 comprises a wheel 24 fitted to a vertical drive shaft 24a perpendicular to the plane of conveyor 3. Wheel 24 is coaxial with plate 21, is located with its outer edge over the inner edge of plate 21, and presents a number of equally-spaced radial appendages 25, each of which "sweeps" over plate 21 when wheel 24 is rotated about its axis (anticlockwise in FIG. 2) so as to move appendages 25 successively between unloading station 22 and loading station 23.

Appendages 25 constitute respective pushers for packets 2 fed successively to station 22 by braking device 9, and provide, firstly, for removing packets 2 in orderly sequence from path 4, in a pickup direction crosswise in relation to traveling direction 16 and parallel to the plane of conveyor 3; secondly, for feeding them in orderly sequence along plate 21 from station 22 to station 23; and, finally, for feeding them, in the same orderly sequence, onto conveyor 5.

As shown in FIG. 2, as packets 2 are transferred from conveyor 3 to conveyor 5, wheel 24 also provides for rotating them 90° in relation to the traveling direction, and about their longitudinal axis perpendicular to the plane of conveyor 3.

To prevent packets 2 from being spun off appendages 25, plate 21 presents a curved outer guide 26 hinged at 27 to a fixed support 28.

As shown in FIG. 1, conveyor 5 is located substantially tangent to the output end of plate 21, and comprises a belt 29 looped about pulleys 30 (only one of which is shown and powered) fitted to and rotated at substantially constant speed by respective shafts 31 perpendicular to the FIG. 1 plane. Belt 29 presents a number of equally-spaced brackets 32 moving with belt 29 and defining respective seats 8 for housing respective packets 2 as they travel along the top branch 33 of belt 29 substantially coplanar with plate 21.

As already stated, therefore, for enabling packets 2 to be transferred and rotated 90° between conveyors 3 and 5 via transfer device 7, the speed of belts 11 and 12 must normally be less than that of conveyor 3 and substantially such as to keep braking device 9 timed in relation to conveyor 5 and transfer device 7, i.e. such as to advance line 10 by a distance equal to the thickness of packet 2 (measured in direction 16) in the time taken by belt 29 to advance by a distance equal to the length of seat 8, i.e. the distance between adjacent brackets 32, and in the time taken by an appendage 25 to cover the arc between stations 22 and 23. Moreover, belts 11 and 12, transfer device 7 and conveyor 5 must obviously operate in time with one another.

To meet the above conditions, device 1 presents a first drive unit 34 (FIG. 2) for driving conveyor 5 and wheel 24 at constant speed and in time with each another; and a second drive unit 35 for driving belts 11 and 12, and which is controlled in known manner by photosensors 20 for keeping braking device 9 in time with belt 29 and wheel 24.

As already stated, conveyor 5 of device 1 described above feeds packets 2 in a direction 37 parallel to, i.e. at an angle of zero degrees in relation to, direction 16. Nevertheless, as can be seen from FIG. 2, direction 37 may form any angle in relation to direction 16, by virtue of said angle varying as a function of the arc formed by plate 21, and may be varied as required by simply varying the arc of plate 21 (which, in the example shown, is an arc of 90°) and by locating conveyor 5 in line with the output end of plate 21 and tangent to wheel 24.

The FIG. 3 and 4 embodiment relates to a device 38 (FIG. 3) also designed for transporting randomly arranged incoming packets 2 in equally-spaced manner.

Like device 1, device 38 comprises a first conveyor 3 for successively feeding randomly arranged packets 2 along a first path 4 in direction 16; a second conveyor 39, similar to conveyor 5 of device 1, for feeding packets 2 in equally-spaced manner along a second path 6 in series with path 4; and a transfer device 40 for successively removing packets 2 from path 4 in a pickup direction crosswise in relation to direction 16, and feeding them into respective seats 41 moving with and equally spaced along conveyor 39.

Like device 1, device 38 also comprises a braking device 42, which, like braking device 9, provides for forming packets 2 into a continuous orderly line 10 in which each contacts an adjacent packet 2.

Device 42 is arranged in series with conveyor 3 along path 4, is structurally similar to device 9, and the component parts of which similar to those of device 9 are indicated using the same numbering system.

Conveyor 39 cooperates with device 42 at loading station 43 at the output end of path 4, and comprises a belt 44 looped about pulleys 45 (only one of which is shown) fitted to respective shafts 46 parallel to shafts 15 of pulleys 13 and 14, arranged crosswise in relation to direction 16, and parallel to the plane of conveyor 3. More specifically, the axis of shaft 46 of at least the pulley 45 closest to device 42 is substantially coplanar with conveyor 3. As such, the input portion of belt 44 contacting the edge of said pulley 45 and traveling through loading station 43 extends through the plane of conveyor 3 in a direction substantially tangent to the output end of path 4 and substantially parallel to said pickup direction. Belt 44 presents a number of equally-spaced boxes 47 moving with belt 44 and each defining a respective seat 41.

As shown in FIG. 4, each box 47 comprises a substantially rectangular plate 48 of the same size as the larger lateral surface of packet 2; and two lateral walls 49 and 50 extending perpendicularly from adjacent lateral edges of plate 48 and respectively parallel to and crosswise in relation to the traveling direction 51 of belt 44. More specifically, wall 50 extends along the rear transverse edge of plate 48, in relation to direction 51, and presents a central recess 52. Each plate 48 is connected to belt 44 by a central hinge 53 parallel to the axis of shafts 46.

When pulleys 45 are rotated (anticlockwise in FIG. 3) for transferring boxes 47 from bottom portion 54 to top horizontal portion 55 of belt 44, each box 47 travels through loading station 43 wherein box 47 is arranged facing the output end of braking device 42, and respective wall 50 is substantially coplannar with portion 17 of belt 11 and with a plate 56 connecting the output end of portion 17 of belt 11 to wall 50.

As shown in FIG. 3, as it travels through loading station 43 crosswise in relation to direction 16, each box 47 provides for rotating respective packet 2 by 90°. As it does so, radial withdrawal of packet 2 from respective box 47 is prevented by a cylindrical guide 57, similar to guide 26, hinged at 58 to a fixed support 59, and supporting a photosensor 60 for detecting, as in the FIG. 1 embodiment, the rate and timing with which packets 2 in line 10 issue from braking device 42.

As already stated and shown clearly in FIG. 3, by virtue of packets 2 in loading station 43 being removed by boxes 47 at substantially constant speed, but perpendicularly to the traveling direction 16 of packets 2 along path 4, it is advisable for packets 2 to be removed from loading station 43 in a direction substantially tangent to said pulley 45, so as to maintain the acceleration of packets 2 within acceptable limits. For this purpose, transfer device 40 comprises a pusher 61 moved back and forth in the pickup direction by a link mechanism 62, and through recess 52 in wall 50 of the incoming box 47, so as to lift off path 4 the first packet 2 in line 10 facing conveyor 39 in loading station 43.

As it removes packets 2 off conveyor 3 in said pickup direction, transfer device 40 provides for rotating packets 2 by 90° about their transverse axis parallel to the plane of conveyor 3 and perpendicular to direction 16.

Like device 1, device 38 provides for feeding packets 2 in orderly sequence on to conveyor 39 by virtue of braking device 42, controlled by photosensor 60, forming packets 2 into a continuous orderly line 10; and by virtue of a drive unit (not shown in FIG. 3 but substantially similar to unit 35) controlled by photosensor 60 so as to synchronize operation of braking device 42 and transfer device 40.

As with device 1, conveyor 39 of device 38 feeds packets 2 in a direction 63 parallel to, i.e. at an angle of zero degrees in relation to, direction 16. As shown in FIG. 3, however, direction 63 may form any angle in relation to direction 16 by simply adjusting, about the axis of shaft 46 of pulley 45 in FIG. 3, the position of the arc over which belt 44 contacts pulley 45. Said angular adjustment, to which corresponds a similar adjustment in the position of the other pulley 45 (not shown) about the axis of shaft 46 of pulley 45 in FIG. 3, is relatively ample, and limited solely by the fact that, for device 38 to function correctly, loading station 43 should preferably be located along said arc.

I claim:

1. A device for equally spaced transportation of randomly arranged incoming products, said device comprising a first conveyor for transporting products successively and in a randomly arranged manner along a first portion of a first path and with a first orientation; a second conveyor for transporting the products at a constant rate along a second path and with a second orientation rotated by 90° relative to said first orientation; transfer means for removing the products at a predetermined rate from said first path; braking means located along a second portion of said first path, for receiving the products from said first conveyor and for forming an orderly line of products for supply, at a predetermined rate to said transfer means; said first and second paths being arranged in series at any predetermined angle to each other; and said transfer means being located between the output end of said first path and said second conveyor, for successively removing the products from said output end in a substantially transverse pickup direction in relation to said first traveling direction; first drive means being provided for operating both said transfer means and said second conveyor in time with each other; second drive means being provided for operating said brake means; and control sensor means being arranged at said output end of said first path to control said second drive means, whereby each product is fed by said brake means to said output end in time with said transfer means.

2. A device as claimed in claim 1, wherein said braking means are located along said first path and in series with said first conveyor.

3. A device as claimed in claim 1, wherein said braking means comprises two powered conveyor belts located on opposed sides of said line of the products.

4. A device as claimed in claim 3, wherein one of said belts is a bottom belt located beneath the other belt for supporting said line; said bottom belt being coplanar with said first conveyor.

5. A device as claimed in claim 1, wherein said pickup direction is parallel to the plane of said first conveyor.

6. A device as claimed in claim 5, wherein said transfer means comprises a wheel mounted for rotation about an axis perpendicular to the plane of said first conveyor and supporting means for supporting the products; said supporting means extending about said wheel for connecting the output end of said first path to the input end of said second conveyor, and along an arc, the size of said arc corresponding to the size of said predetermined angle; said wheel including a plurality of equally spaced radial appendages moving with said wheel along said supporting means, for successively feeding products along said supporting means and between said output and input ends.

7. A device as claimed in claim 6, wherein said supporting means comprises a flat plate extending about the axis of said wheel and transverse in relation to said first path at said output end.

8. A device as claimed in claim 7, wherein said plate is coplanar with said first conveyor.

9. A device as claimed in claim 1, wherein said pickup direction is perpendicular to the plane of said first conveyor.

10. A device as claimed in claim 9, wherein said second conveyor cooperates with said braking means at the output end of said first path, and comprises a belt looped about at least one pulley having its axis parallel to the plane of said first conveyor and transverse in relation to said first direction.

11. A device as claimed in claim 10, wherein the axis of said pulley is substantially coplanar with said first conveyor.

12. A device as claimed in claim 11, wherein said belt includes a number of equally spaced boxes, each defining a seat for a respective product; the input portion of said belt being substantially tangent to said output end and extending through the plane of said first conveyor.

13. A device as claimed in claim 12, wherein said transfer means comprises a pusher located between said input portion of said belt of said second conveyor and said output end; and actuating means for moving said pusher back and forth at a predetermined rate through said plane and in said pickup direction.

14. A device as claimed in claim 13, wherein said actuating means comprises a link mechanism connected to said drive means.

* * * * *